United States Patent
Vallomy

[19]

[11] Patent Number: 6,021,723

[45] Date of Patent: Feb. 8, 2000

[54] HAZARDOUS WASTE TREATMENT METHOD AND APPARATUS

[75] Inventor: John A. Vallomy, 12018 Prails Mill La., Charlotte, N.C. 28262

[73] Assignee: John A. Vallomy, Charlotte, N.C.

[21] Appl. No.: 08/868,879

[22] Filed: Jun. 4, 1997

[51] Int. Cl.[7] ................................ F23B 5/00; F23J 15/00; F23J 3/00

[52] U.S. Cl. .................... 110/203; 110/212; 110/216; 110/229; 110/292; 110/293; 110/345; 588/900

[58] Field of Search ...................... 110/203, 210, 110/214, 215, 216, 229, 235, 250, 255, 256, 259, 322, 345, 346, 292, 293, 267, 101 R, 105, 212; 588/204, 900

[56] References Cited

U.S. PATENT DOCUMENTS

| | | | |
|---|---|---|---|
| 4,644,877 | 2/1987 | Barton et al. | 110/250 X |
| 4,878,440 | 11/1989 | Tratz et al. | 110/229 X |
| 4,909,162 | 3/1990 | Vollhardt | 110/229 X |
| 5,000,101 | 3/1991 | Wagner | 110/250 X |
| 5,159,899 | 11/1992 | Dobrzynski | 110/229 X |
| 5,169,605 | 12/1992 | Carpentier | 110/210 X |
| 5,451,738 | 9/1995 | Alvi et al. | 110/250 X |
| 5,615,627 | 4/1997 | Marr, Jr. | 110/250 X |
| 5,765,489 | 6/1998 | Hugentobler et al. | 110/250 X |
| 5,809,911 | 9/1998 | Feizollahi | 110/250 X |

OTHER PUBLICATIONS

Webster's II New Riverside University Dictionary, The Riverside Publishing Company, p. 390, 1994.

*Primary Examiner*—Ira S. Lazarus
*Assistant Examiner*—Ljiljana V. Ciric
*Attorney, Agent, or Firm*—Dougherty & Associates

[57] ABSTRACT

A method and apparatus for heat treating of hazardous waste by heating the waste in a pyrolyzing chamber and forming an off-gas, heating the off-gas for a sufficient time to destroy dioxins and furans, then reducing and cooling the off-gas in a secondary treating chamber having a graphite stack and recovering metallics by distillation.

14 Claims, 1 Drawing Sheet

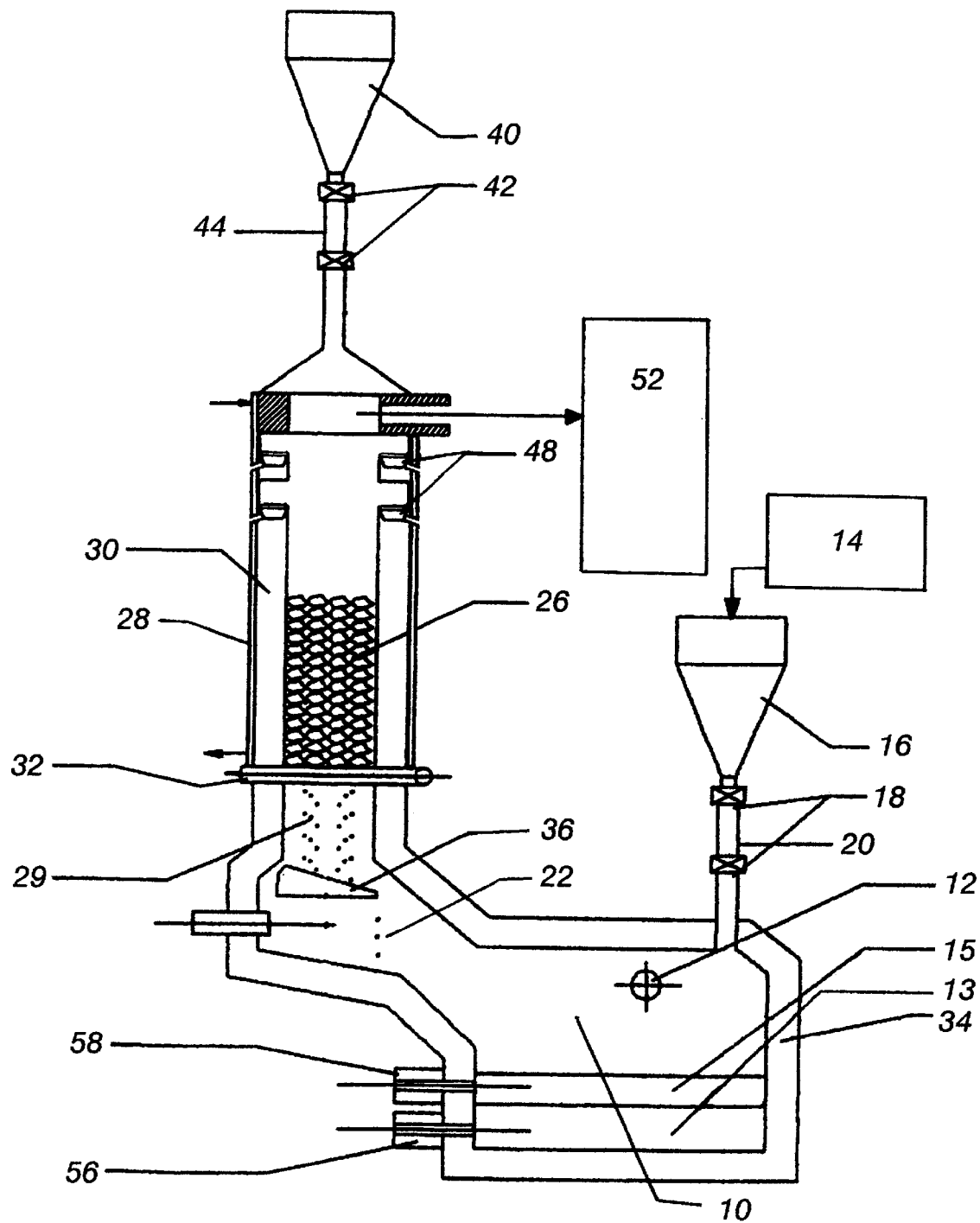

HAZARDOUS WASTE TREATMENT METHOD AND APPARATUS

BACKGROUND OF THE INVENTION

The development of our technological society gives rise to large quantities of waste of many different natures. At the present time, there are few technologies that can process and recycle waste with the efficiencies required by current regulations. Some of the processes that attempt to achieve this are extremely sophisticated or complex, which makes their application on an industrial basis quite difficult.

One method is incineration and further recovery of the by-product train. Incineration is susceptible to generate undesirable components such as $NO_x$ and dioxines due to the oxidizing atmosphere required for the operation. Also the process is conducted at relatively low temperature and the degree of waste destruction is relatively low.

Another waste treating method injects the waste into a liquid bath (metal or slag), cracking the components to their basic elements. The control of such process is quite sophisticated, and the ability to maintain the process under control in an industrial environment is questionable.

Other processes under development are based on plasma torch technology. In general the problems associated with a plasma torch process are refractories, reliability of the destruction rate, and lack of ability to process bulk materials.

SUMMARY OF THE INVENTION

The invention consists of a pyrolyzing chamber heated by a plasma torch or similar device. Waste is pyrolyzed in this chamber forming a gas which flows to a post-reaction area heated by a second plasma torch or other heating device which completes the destruction of all the hazardous species of the waste. The off-gas and entrained liquid and solid particulates flow through secondary treating chamber having a carbon stack therein that creates a reducing environment for cooling of the gas. A cooling zone having a set of distillation trays is located downstream to collect species that are condensible and have commercial value. The off gas is removed and treated to recover other by-products, which makes this process an integrated recycling process.

Solid hazardous waste is loaded from a bin via a lock-hopper or similar mechanism into a high temperature pyrolyzing chamber which is heated by a plasma torch, oxy-fuel burner, or similar method. Liquid waste is preferably charged through a plasma torch arrangement. The products of the pyrolyzation are gases, liquid metals and/or slag. Liquid metals and slag are removed from the high temperature pyrolyzing chamber via two tapping holes controlled by tapping devices and recycled. Gases evolving from the pyrolyzing chamber are exposed to a high temperature flame of a plasma torch or similar device to destroy any undesirable compound that does not crack in the pyrolyzing chamber. The exposure of these gases to the high temperature of the plasma torch produces a very high destruction rate of all the compounds.

In order to prevent the formation of dioxins and/or furans, a reducing environment is maintained throughout the secondary treating cycle of the gas. The gas is blown through a bed of carbon then into a cooling zone with a set of trays to condense by-products. Other components of the off-gas are recovered as useful by-products in an associated gas treating system.

OBJECTS OF THE INVENTION

It is an object of the invention to furnish a new and enhanced method to treat waste.

A further object of the invention is to provide a simple waste treatment method that allows recycling of the products obtained from the destruction of the waste.

Another object of the invention is to provide a method having high flexibility that can process waste in gaseous, liquid or solid form with a wide range of chemical compositions and with minimum conditioning of the waste charge.

DESCRIPTION OF THE DRAWINGS

The foregoing and other objects will become more readily apparent by referring to the following detailed description of the invention and the appended drawing, in which:

The single FIGURE is a schematic diagram showing the general arrangement of the apparatus in accordance with the present invention.

DETAILED DESCRIPTION

The invented apparatus consists of a pyrolyzing chamber heated by a plasma torch, oxy-fuel burner, oxidizing gas injection nozzle or other suitable heating means, with an associated waste charging system. A post reaction area is heated by another plasma torch or similar device. Off-gas is passed to a secondary gas treating chamber containing a graphite stack and having a graphite/carbon charging system and an associated cooling zone. These graphite or amorphous carbon stacks may be a set of perforated disks aligned to provide a labyrinth to the off-gas, similar to a checker-work. The arrangement allows the replacement of the carbon stack for maintenance purposes.

Referring now to the figure, a pyrolyzing chamber 10 is heated by a plasma torch 12 or similar heating device. Solid waste 14 is charged into pyrolyzing chamber 10 via a solid waste charging hopper 16 connected to the pyrolyzing chamber by means of a lock hopper system 18 purged with inert gas through purge line 20. Optionally, liquid waste can be charged to the pyrolyzing chamber through the plasma torch 12. The temperature of the chamber is maintained above 3000° F. for complete destruction of the chemical waste compounds charged. This high temperature causes the formation of liquid metals and/or slag that may be contained in the waste and/or added to the charge as fluxes and reactants. The amount and relative chemistry of the slag and molten metal depends on the chemical composition of the waste. The molten metal 13 and slag 15 settle in the bottom of chamber 10. Depending on the gas utilized for plasma torch fuel, some of the carbon contained in the waste will react to form CO or $CO_2$, the reaction being influenced by the partial pressure of oxygen maintained in the pyrolyzing chamber. In general this chamber is maintained under reducing conditions, depending on the refractory material used for the chamber lining. The residence time of the gas in the pyrolyzing area may vary with the particular operating conditions, but normally and preferably is maintained for at least 2.0 seconds.

The gas generated in the pyrolyzing chamber flows through post reaction area 22, and is subjected to additional heating by the direct flame of a second plasma torch 24 or similar heating device. The partial pressure of oxygen is controlled to burn any excess solid carbon particles in the off-gas stream before reaching the graphite stack 26 in secondary treating chamber 28. Any compound that may have left the pyrolyzing chamber unreacted is completely destroyed in post reaction area 22. The residence time in the post reaction area is at least about 2.0 seconds, and the temperature is maintained in the range of about 2500° F. to 3000°.

The off gas flows through secondary treating chamber 28, which is lined with refractory 30 and filled with pre-formed graphite shapes, such as disks or cylinders, forming graphite stack 26. The gas flow through stack 26, reduces the partial pressure of $O_2$, and converts any $CO_2$ formed to CO. This reaction is endothermic and lowers the temperature of the gas as it flows through the graphite stack. The operating temperature of this cooling zone is selected according to the particular species of converted waste found in the system. The off-gas may contain gaseous metals and compounds with high vapor pressure at the operating conditions observed in the system.

Some metals will condense to liquid droplets 29 in the graphite stack and flow back to the pyrolyzing chamber.

A water cooled grid 32 at the lower end of chamber 28 retains the graphite stack in place, the stack acting like a checkerwork. Smaller pieces of graphite that can not be contained by water-cooled grid 32 located below the graphite stack, fall back to the pyrolyzing chamber 10 and float in the liquid metal and/or slag, and react with the oxidizing gases above the liquid. The material of the pyrolyzing vessel lining 34 is selected based on the particular conditions of operation, such as partial pressure of oxygen ($pO_2$), chamber temperature and chemistry of the waste. For this reason the vessel preferably is exchangeable with another like vessel to facilitate the operation with different wastes.

A heat shield 36 is provided between the post reduction area 22 and the grid 32. Under certain conditions, the graphite stack 26 will be consumed by gases with relatively high partial pressure of oxygen. Thus, a graphite/carbon charging hopper 40 or similar feed mechanism is connected to the secondary treating chamber by means of a lockhopper system 42. The lockhopper system has an inert gas purge 44 to prevent any air entrapment during the charging process.

Above the graphite stack are several distillation trays 48 for condensing pure metals or compounds before the gas is removed from the cooling zone and delivered to a further gas treatment system 52. The ability of these trays to condense metals or compounds depends on the chemistry of the off-gas and the condensation temperature of those metals or compounds.

The off-gas leaving the graphite stack is processed via a gas treatment system 52. This system recovers by-products, such as mercury, hydrochloric acid, and others that have commercial value. The configuration of the gas treatment system 52 varies with the chemistry of the waste. Typically, gas treatment system 52 consists of a quencher to cool the process gas to about 200–300° C., the exact temperature depending on the operating pressure, a caustic scrubber or a hydrochloric acid recovery tower if the waste contains chlorine, a filter to remove small particles, and an activated carbon filter to strip off mercury, as required, a thermal oxidizer or a flare stack, along with a synthetic gas storage tank if synthetic gas is used in the plant in which the apparatus is located.

From time to time some liquid metal and/or slag may be removed from the pyrolyzing chamber 10 via two tapping holes, a lower metal tapping hole 56, and an upper slag tapping hole 58.

EXAMPLE

The following is an example of the application of the invented process to the treatment of soil contaminated with 1,4 dichlorobenzene. It is presumed that the contaminated soil has 30% silica ($SiO_2$) and 70% 1,4 dichlorobenzene. CaO is added to the charge in order to form a slag with the $SiO_2$ contained in the waste. Carbon dioxide ($CO_2$) is also injected mixed with the waste, which is mildly oxidizing and will react with the carbon produced by cracking of the dichlorobenzene to form carbon monoxide (CO) and chlorine (Cl). The particular mode of operation is determined by a technical and economic analysis. For the material balance, it is assumed that dust losses are negligible.

The byproducts of the treatment are synthesis gas and hydrochloric acid.

The energy required by the process is provided by a set of oxyfuel burners with a total capacity of 270,000 Kcal/hr.

| Waste | 16.3 | Kg/min. |
|---|---|---|
| $O_2$ | 6.85 | $Nm^3$/min. |
| CaO | 3.2 | Kg/min. |

This mix maintains the material and energy balance in the pyrolyzing chamber. The formation of some carbon dust is expected, however this dust is oxidized in the post reaction area via additional injection of oxygen which allows control of the partial pressure of oxygen in that area. Any $CO_2$ present in the off gas is reduced by the carbon stack.

The output is:

Gas:

| CO | 13.7 | $Nm^3$/min. |
|---|---|---|
| HCl | 2.3 | $Nm^3$/min. |
| $H_2$ | 3.4 | $Nm^3$/min. |

Liquid Slag

| $SiO_2$ | 3.4 | Kg/min. |
|---|---|---|
| CaO | 3.2 | Kg/min. |

SUMMARY OF THE ACHIEVEMENT OF THE OBJECTS OF THE INVENTION

From the foregoing, it is readily apparent that I have invented a new and enhanced heat process and apparatus for treating waste, which allows recycling of the products obtained from the destruction of the waste, and has such high flexibility that it can process waste in gaseous, liquid or solid form with a wide range of chemical compositions and with minimum conditioning of the waste charge.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. Apparatus for treatment of waste containing toxic and/or hazardous substances comprising:
    a heated pyrolyzing chamber for primary destruction of waste;
    means for heating said pyrolyzing chamber and for maintaining the interior of said pyrolyzing chamber at a high temperature;
    a charging mechanism connected to said pyrolyzing chamber for introducing waste to said chamber;
    a post reaction area associated with said pyrolyzing chamber and adjacent said pyrolyzing chamber;

means for heating said post reaction area;

a gas off-take communicating with said post reaction area;

a cooling zone communicating with said gas off-take for passing off-gas through said cooling zone and said gas off-take; and a stack of eraphite articles in said cooling zone.

2. Apparatus according to claim 1, wherein said means for heating said pyrolyzing chamber is selected from the group consisting of plasma torch, oxy-fuel burner, or oxidizing gas injection nozzle.

3. Apparatus according to claim 1, wherein said means for heating said post reaction area is selected from the group consisting of plasma torch, oxy-fuel burner, and oxidizing gas injection nozzle.

4. Apparatus according to claim 1, wherein said charging mechanism is a charging hopper having an associated lock-hopper mechanism.

5. Apparatus according to claim 1, further comprising distillation trays in said cooling zone for separating and recovering volatile elements.

6. Apparatus according to claim 1, wherein said graphite articles are perforated disks.

7. Apparatus according to claim 6, further comprising means for replenishing said graphite articles in said stack.

8. Apparatus for treatment of waste containing toxic and/or hazardous substances comprising:

a pyrolyzing chamber for primary destruction of waste, said pyrolyzing chamber having a liquid metal tapping hole and a slag tapping hole;

means for heating said pyrolyzing chamber and for maintaining the interior of said pyrolyzing chamber at a temperature of greater than about 3000° F. (1650° C.);

a charging mechanism connected to said pyrolyzing chamber;

a post reaction area adjacent to said pyrolyzing chamber and coterminous with said pyrolyzing chamber;

means for heating said post reaction area to a temperature from about 2500° F. (1370° C.) to about 3000° F. (1650° C.) for a period of at least 2 seconds;

a gas off-take communicating with said post reaction area and coupled to said pyrolyzing chamber;

a secondary treating chamber connected to said gas off-take for passing off-gas through said second treating chamber and said gas off-take; and a stack of graphite articles in said second treating chamber for reducing the temperature. of the off-gas passing therethrough.

9. Apparatus according to claim 8 wherein said means for heating said pyrolyzing chamber is selected from the group consisting of plasma torch, oxy-fuel burner, and oxidizing gas injection nozzle.

10. Apparatus according to claim 8 wherein said means for heating said post reaction area is selected from the group consisting of plasma torch, oxy-fuel burner, and oxidizing gas injection nozzle.

11. Apparatus according to claim 8 wherein said charging mechanism is a charging hopper having an associated lock-hopper mechanism.

12. Apparatus according to claim 8 further comprising distillation trays in said secondary treating chamber for separating and recovering pure metals and compounds.

13. Apparatus according to claim 8 wherein said graphite articles are perforated disks.

14. Apparatus according to claim 13 further comprising means for replenishing said graphite articles in said stack.

* * * * *